United States Patent Office 3,469,260
Patented Sept. 23, 1969

3,469,260
REMOTELY MONITORED AND CONTROLLED
AIRBORNE TELEVISION SYSTEM
Lloyd Junior Holt, Ridgecrest, and Harry L. Myers, China Lake, Calif., assignors to the United States of America as represented by the Secretary of the Navy
Filed Jan. 16, 1968, Ser. No. 698,313
Int. Cl. G01s 9/00
U.S. Cl. 343—6          4 Claims

ABSTRACT OF THE DISCLOSURE

A visual monitoring aid is provided which may be used, for example, for flying a lead drone and one or more slave drone aircraft in precision formation. A lead drone is equipped with a TV pod mounted on the wing. The lead drone is controlled by conventional remote control methods and the slave drone(s) remotely controlled to fly in a formation position which is within the field of view of the television camera.

Government interest

The invention described herein may be manufactured and used by or for the Government of the United States of America for governmental purposes without the payment of any royalties thereon or therefor.

Background of the invention

Multiple targets, when properly spaced, can be an effective countermeasure against certain missile guidance systems by "confusing" the tracking section and causing loss of lock-on.

A control system according to the present invention was implemented in order to maintain two or more drones in specified close order formations, in order to evaluate the ability of missile guidance systems to discriminate between the target aircraft and other aircraft in close proximity and in various positions.

The slaved drone may be maneuvered into a formation position close to the lead drone, by a controlling chase plane. At this pint, the chase plane pilot can transfer control to a ground based slave drone remote control operator.

TV drone control according to the present invention may be initiated in the same manner. When the slave drone is maneuvered into a formation position close to the lead drone by a chase plane, the chase plane pilot will transfer control to the ground based, slave drone TV console operator.

When the drones are in formation, the TV camera on the lead drone will have the slave drone in the field of view. The video from the camera is transmitted to a TV monitor on the slave drone console in the ground base of operations. The slave drone console operator then utilizes the visual presentation to maintain the angular and spacing position of the slave drone with respect to the lead drone.

The TV concept for controlling slave drones presented difficulty in monitoring the relative range of the two drones. Large range rates could build up before the operator became aware of it. In order to be able to maintain the correct range, a ranging system utilizing a transponder in each drone was implemented in which the relative range measured by transponders may be transmitted to the slave drone operator enabling him to maintain the correct range.

Summary of the invention

The system according to the present invention consists basically of control mechanism, which in the disclosed device includes a slave drone, and a lead drone, a TV camera on the lead drone directed toward the slave drone, a television transmitter which supplies the ground controller with angular position data, a range transponder for each drone, and a separate command data link and controller for each drone.

The lead drone, equipped with the television equipment in a TV pod, is controlled by an operator of a remote ground based console. The lead drone operator utilizes a three co-ordinate plotting board (with inputs from a tracking radar system) to monitor the flight of the drone if necessary, to maintain the prescribed flight plan.

The present invention may be used in conjunction with a digital computer with angular position inputs from the TV pod on the lead drone, slant range from the ranging transponders, and radar and telemetry inputs to generate flight correction signals for the slave drone.

Detailed description of the invention

Figure 1:
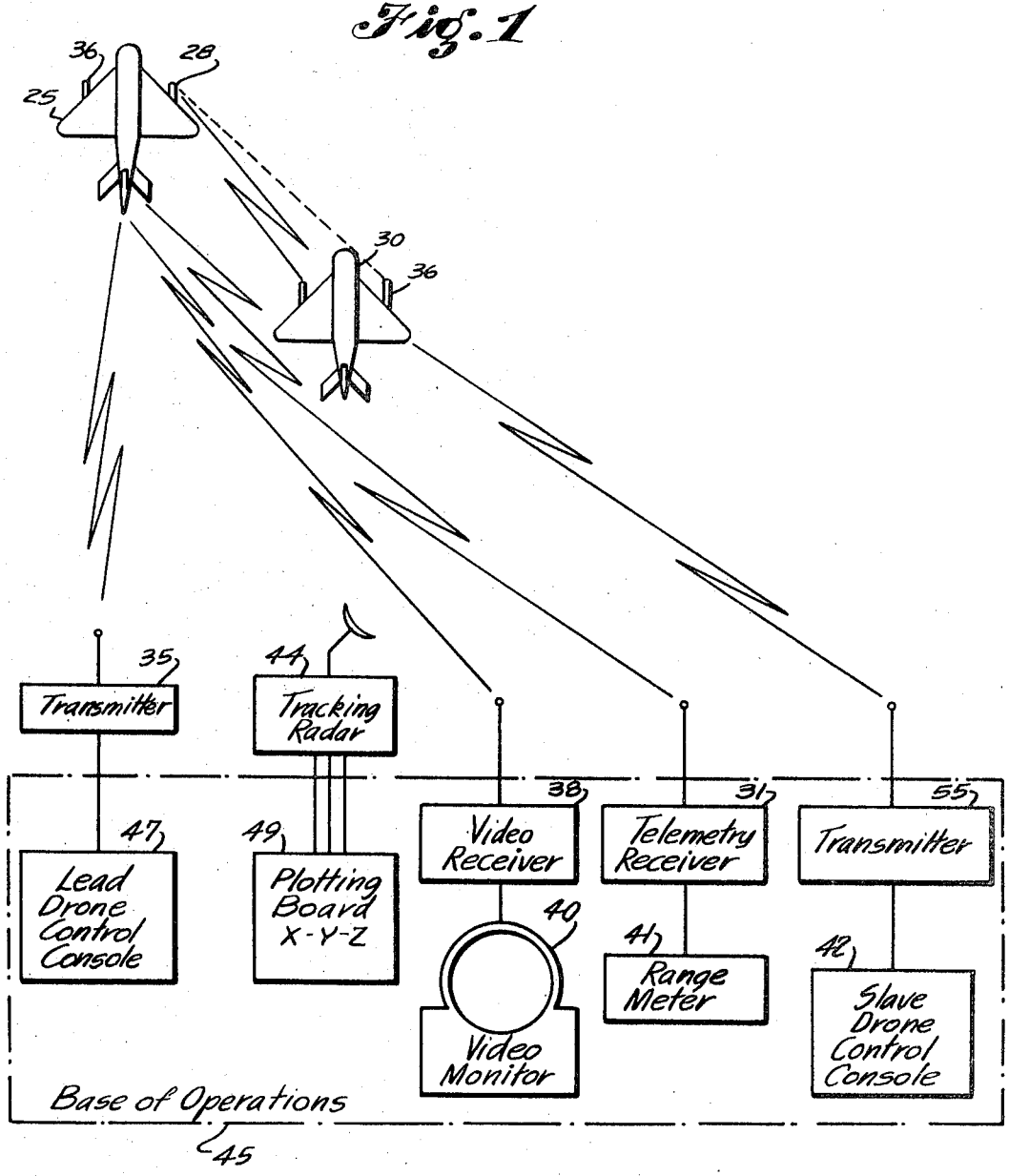
FIG. 1 is a schematic diagram, partly in block form, of a Drone Control System utilizing a remote control device according to the present invention.

When drones are flown in formation according to the present invention, (FIG. 1), the lead drone 25 has a TV camera 27 in pod 28 with the slave drone 30 in the field of view. The video from the camera 27 is displayed on a TV monitor 40 located near the slave drone console 42 in the base of operations 45. The slave drone console operator can then utilize the visual presentation to maintain the angular position of the slave drone 30 with respect to the lead drone 25.

Because range changes can occur before a change in image size is visually detected on the TV monitor, a ranging system is provided utilizing a transponder 50 in the nose section of a pod on each drone. The relative range, measured by the transponders, is transmitted from drone 25 through telemetry and is displayed by range meter 41 to the drone operator.

A more sophisticated NWC concept of an automatic system for controlling the slave drone utilizes a digital computer with angular position inputs from the TV camera 27 on the lead drone, slant range from the ranging transponders 50, and radar and telemetry inputs to generate flight correction signals for the slave drone 30.

TV pod, general description

Figure 2:
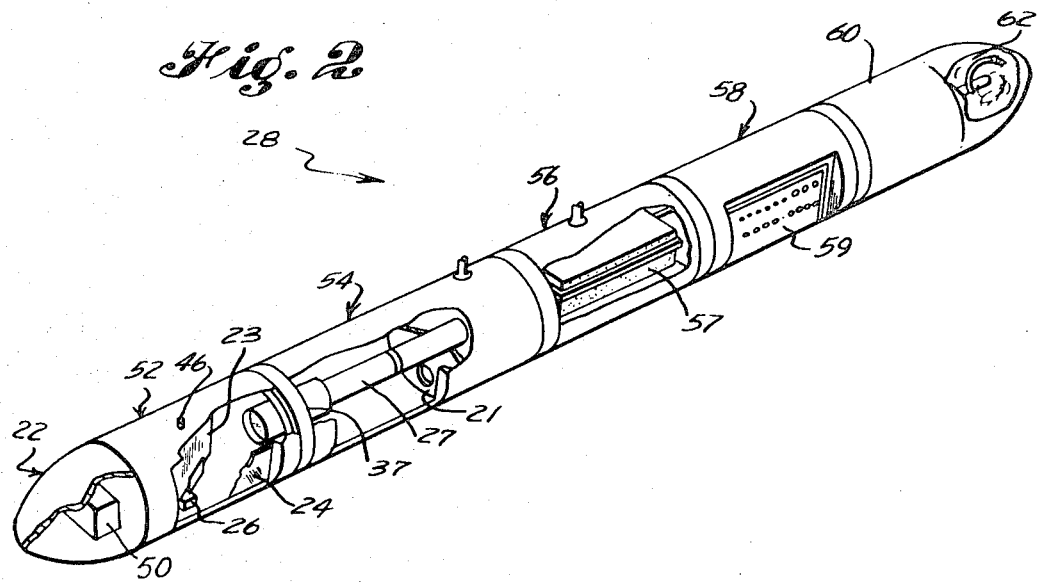
FIG. 2 is a perspective view of a typical TV pod with portions broken away to expose portions of the interior.

The TV pod 28 (FIG. 2) is an aerodynamically designed, wing mounted pod that consists of a nose or ranging transponder section 22, gimbaled mirror section 52, TV camera section 54, transmitter section 56, electric distribution/test section 58, and a TV pod recovery section 60.

The gimbaled mirror section 52 of the TV pod 28 is oriented to view a sector of space in which the slave drone is positioned. When the slave drone moves from its relative position, the mirror section 52 is changed by remote commands to hold the slave within the field of view of the TV camera 27.

Relative range is measured by the ranging transponder 50 located in the nose section 22 of the pod 28. The measured relative range data are transmitted to the ground-base, slave drone console operator to permit him to control the range between the lead and slave drone.

The TV camera 27 has zoom capabilities to provide close up view of the slave drone. In addition, iris size can be controlled by the remote operator.

The transmitter section 56 contains a TV transmitter 57. The transmitter 57 operates at a frequency of 900 megacycles and transmits through a blade type antenna (not shown) to the receiver 38 in the base of operations.

Section 58 contains switching circuits for the camera zoom, iris and focus, mirror scanning and TV Pod Recovery systems. This section also contains the transmitting antenna (not shown), test circuit and switches to provide a complete checkout of the system prior to flight.

The section 60 houses a parachute system 62 to recover the TV pod if the carrier drone is disabled. In emergencies, the ground controller may release the TV pod from the aircraft. If a Flight Termination (DESTRUCT) command is initiated, provisions have also been included to jettison the pod prior to completion of the Flight Termination sequence. When the pod is released from the aircraft, a switch in the pod closes to start an electrical 4-second time delay period. During this time delay period the pod falls freely and decelerates due to drag and tumbling. Four seconds after release from the aircraft, an electrical relay circuit is energized to apply power from a battery, for example, to electrically initiate an explosive bolt, thus releasing the parachute from the TV pod. For a better understanding of the recovery system, reference may be had to applicants' prior Patent No. 3,273,835 issued Sept. 30, 1966.

A dummy pod 36, located on the alternate wing of the drone, provides aerodynamic stability for the drone. The dummy pod does not carry ballast to be equal in weight to the equipment pod as differences in weight do not affect the flight characteristics of the aircraft.

Dummy pods are also of importance to provide identical radar signatures for both drones.

Mirror section, functional description

The mirror section 52 is located just aft of the nose cone 22 and contains the mirror 23, mirror gimbals 26 and an electrical motor (not shown) to drive the mirror. The vertical drive motor 32 is located in the camera section 54, and uses the zoom housing as a pivot point to move the complete mirror section 52 in the vertical plane.

The mirror section provides a means of deflecting the camera view horizontally 90±20 degrees from the longitudinal axis of the TV pod, and 0±20 degrees from the vertical axis of the TV pod.

A portion of the mirror section of the pod's skin is provided with a window 24 to allow the camera to look at the slave drone.

Movement of the mirror 23 by the ground controller provides an aid in initially locating the slave drone in addition to providing a means of accommodating a number of flight formations.

Figure 3:
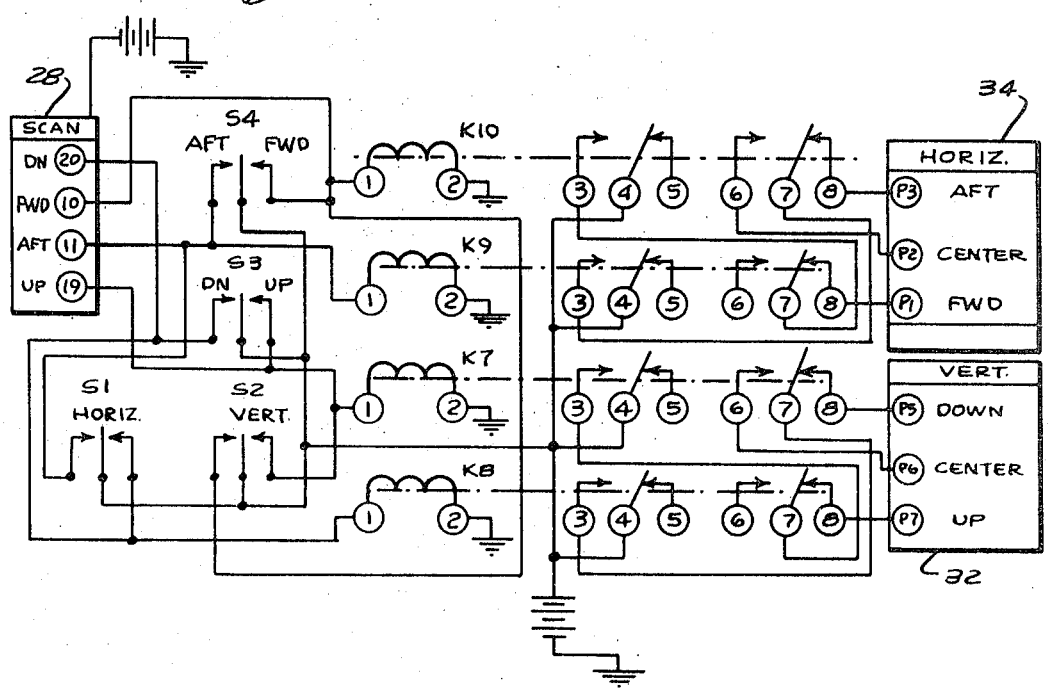
FIGS. 3 and 4 are circuit diagrams illustrating the operation of the electrical control of the system.

When the "scan down" command is received, it is routed through pin 20 of the umbilical plug to the coil of relay K8 (FIG. 3). Relay K8 energizes, applying power through the fourth and third contacts of relay K8, and the seventh and eighth of de-energized relay K7, to pin P5 of the vertical scan motor. The vertical scan motor 32 will drive the mirror section 52 down until the command signal is removed, or until the mirror section 52 is at the extreme down limit.

When the "scan up" command is received it is routed through pin 19 of the umbilical plug 28 to the coil of relay K7. Relay K7 energizes, applying power through the fourth and third contacts of relay K7 and the seventh and eighth contacts of de-energized relay K8, to pin P7 of the vertical scan motor 32. Vertical scan motor 32 will drive the mirror section 52 up until the "scan up" command is removed, or until the mirror section 52 is at the extreme up limit.

When the "scan up" and "scan down" signals are received simultaneously, both relay K7 and K8 will be energized, applying power through the third and fourth contacts of relay K8, the seventh and sixth contacts of relay K7, to pin P6 of the vertical drive motor 32. Vertical scan motor 32 will drive the mirror section 52 to the center position in the vertical plane.

The operation of relays K9 and K10 for the horizontal plane is identical to that described for the vertical plane.

Switches S2, S3, and S4 are provided for checkout of the TV pod, and operate relays 7–10 in a like manner.

Camera section, functional description

The TV camera 27 is bearing mounted in the camera section frame 54 and rotates with the mirror section 52 in vertical scan movements to provide correct aircraft attitude on the monitor 40. The camera 27 is equipped with a zoom lens 37 in order to provide the ground controller with close up views of the slaved drone 30. The zoom movements of lens 37 and opening or closing of the camera iris can be remotely controlled by the ground controller. The focus is adjusted manually during the preflight checkout procedure.

Figure 4:
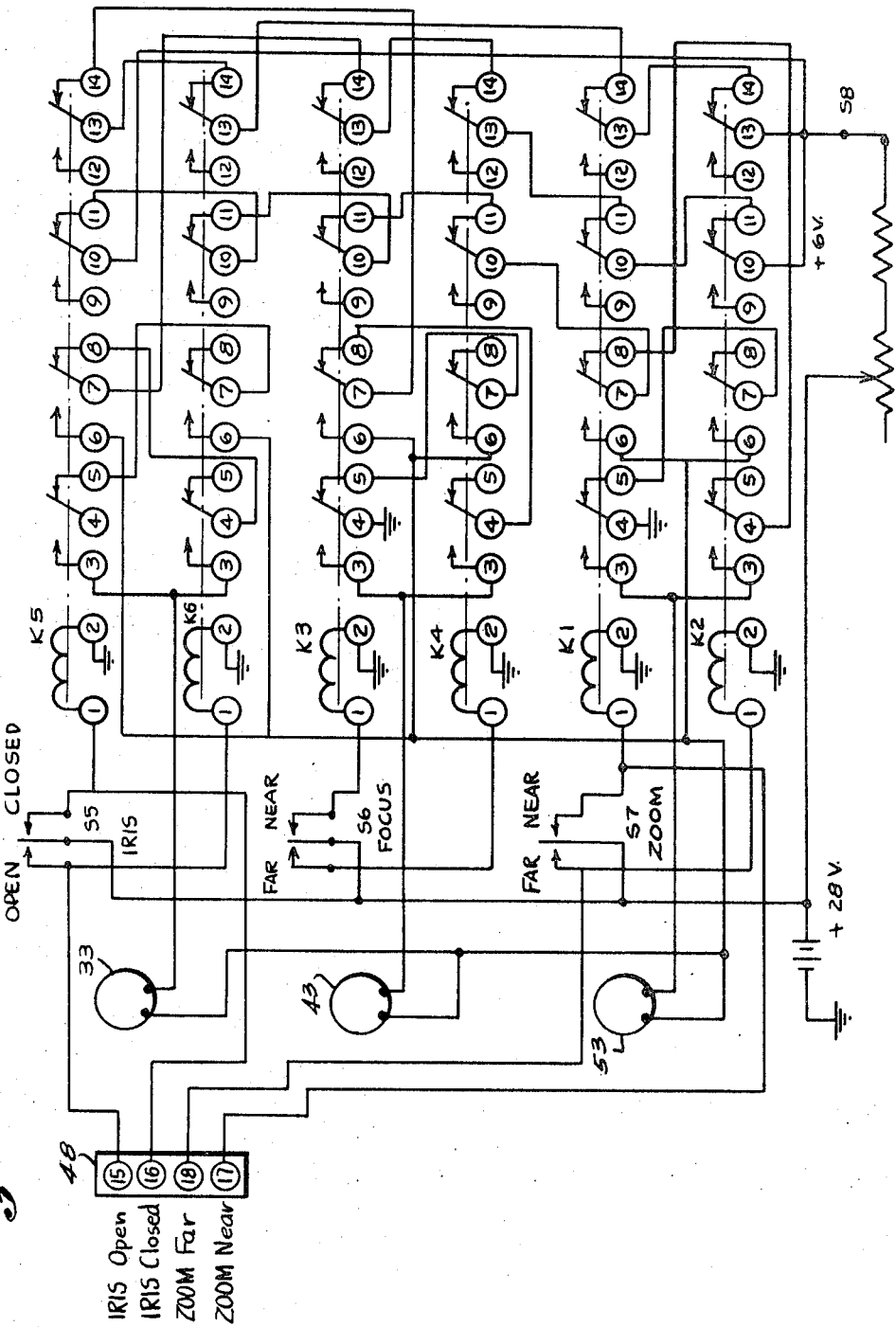

When the "zoom far" command is received, it is routed through pin 18 of the umbilical plug 48 to the coil of relay K2 (FIG. 4). Relay K2 energizes and power is applied through switch S8 to the tenth and eleventh contacts of relay K5, the tenth and eleventh contacts of relay K6, the tenth and eleventh contacts of relay K3, the tenth and eleventh contacts of relay K4, the seventh and eighth contacts of relay K1, and the fourth and third contacts of energized relay K2 to the zoom motor 53. Ground for the zoom motor is applied through the fourth and fifth contacts of de-energized relay K1 and the seventh and sixth contacts of energized relay K2. The zoom motor 53 will then drive the zoom lens 37 until the "zoom far" signal is removed or the lens has reached the extreme "zoom far" limit. A friction type clutch (not shown) is provided to reduce strain on the zoom motor mechanism when the zoom lens is driven to the extreme limits.

The drive signals for the motors 33, 43, 53 are interlocked through contacts of relays K1 through K6 to prevent use of more than one drive motor at a time.

When the "zoom near" command is received, it is routed through pin 17 of the umbilical plug to the coil of relay K1. Relay K1 energizes and power is applied through switch S8 to the tenth and eleventh contacts of relay K5, the tenth and eleventh contacts of relay K6, the tenth and eleventh contacts of relay K3, the eleventh and tenth contacts of relay K4, and the seventh and sixth contacts of energized relay K1 to the zoom motor 53. Ground for the zoom motor 53 is applied through the fourth and third contacts of energized relay K1 to the zoom motor. This action of the zoom motor is reversed frm that described for the "zoom far" command.

Operation of relays K5 and K6 for the "iris open" and "iris closed" commands is identical to that described for the zoom motor.

Focusing of the camera is accomplished during preflight checkout of the system. When switch S6 is placed to the "focus far" position, power is applied to the coil of relay K4. Relay K4 energizes and power is applied through switch S8 to the thirteenth and fourteenth contacts of relay K2, the thirteenth and fourteenth contacts of relay K1, he thirteenth and fourteenth contacts of relay K6, the thirteenth and fourteenth contacts of relay K5, the seventh and eighth contacts of relay K3 and the fourth and third contacts of energized relay K4 to the focus drive motor 43. Ground for the focus motor 43 is applied through the fourth and fifth contacts of relay K3 and the seventh and sixth contacts of energized relay K4 to the focus motor 43. The focus motor 43 will then drive the focus lens until switch S6 is released or the extreme "focus far" limit is reached.

Switches S5 through S8 like switches 2–4 are provided for preflight checkout and alignment.

While the control system according to the present invention has been disclosed in particular with an embodiment involving formation drone control, it will be appreciated by those of ordinary skill in telemetry and remote control devices that the disclosed remote control method and apparatus has the capability of wide and varied application in its field.

What is claimed is:

1. Remote control and monitoring means comprising:
    (a) first dirigible means;
    (b) one or more second dirigible means;
    (c) said first dirigible means comprising:
        (1) a remotely controllable image transmission device focused on each said second dirigible means,
        (2) first range transponder means,
        (3) remotely controllable means for controlling movement of said first dirigible means, and
        (4) remotely controllable means for aiming and focusing said image transmission device,
    (d) each of said second dirigible means including:
        (1) second range transponder means, and
        (2) remotely controllable means for controlling movements of said second dirigible means,
    (e) control and monitoring means remote from said dirigible means and comprising:
        (1) means for receiving and displaying said image,
        (2) means for receiving and displaying information from said range transponder, and
        (3) means for operatively remotely controlling the movements of each of said dirigible means.

2. Remote control and monitoring means according to claim 1, said control and monitoring means remote from said dirigible means further comprising radar tracking means for each said dirigible means.

3. Remote control and monitoring means according to claim 1 wherein each said image transmission device and said means for receiving and displaying said image comprise conventional television equipment.

4. Remote control and monitoring means according to claim 1 wherein said dirigible means comprise drone aircraft.

References Cited

UNITED STATES PATENTS

| | | |
|---|---|---|
| 2,637,022 | 4/1953 | De France. |
| 2,792,190 | 5/1957 | Seibold _____ 244—3.11 |
| 2,924,652 | 2/1960 | Kramskoy _____ 244—3.14 X |
| 2,995,739 | 8/1961 | Mannheimer. |
| 3,273,835 | 9/1966 | Holt et al. _____ 244—1 X |
| 3,312,971 | 4/1967 | Gehman _____ 343—112 X |

RODNEY D. BENNETT, Jr., Primary Examiner

MALCOLM F. HUBLER, Assistant Examiner

U.S. Cl. X.R.

244—3.14